UNITED STATES PATENT OFFICE.

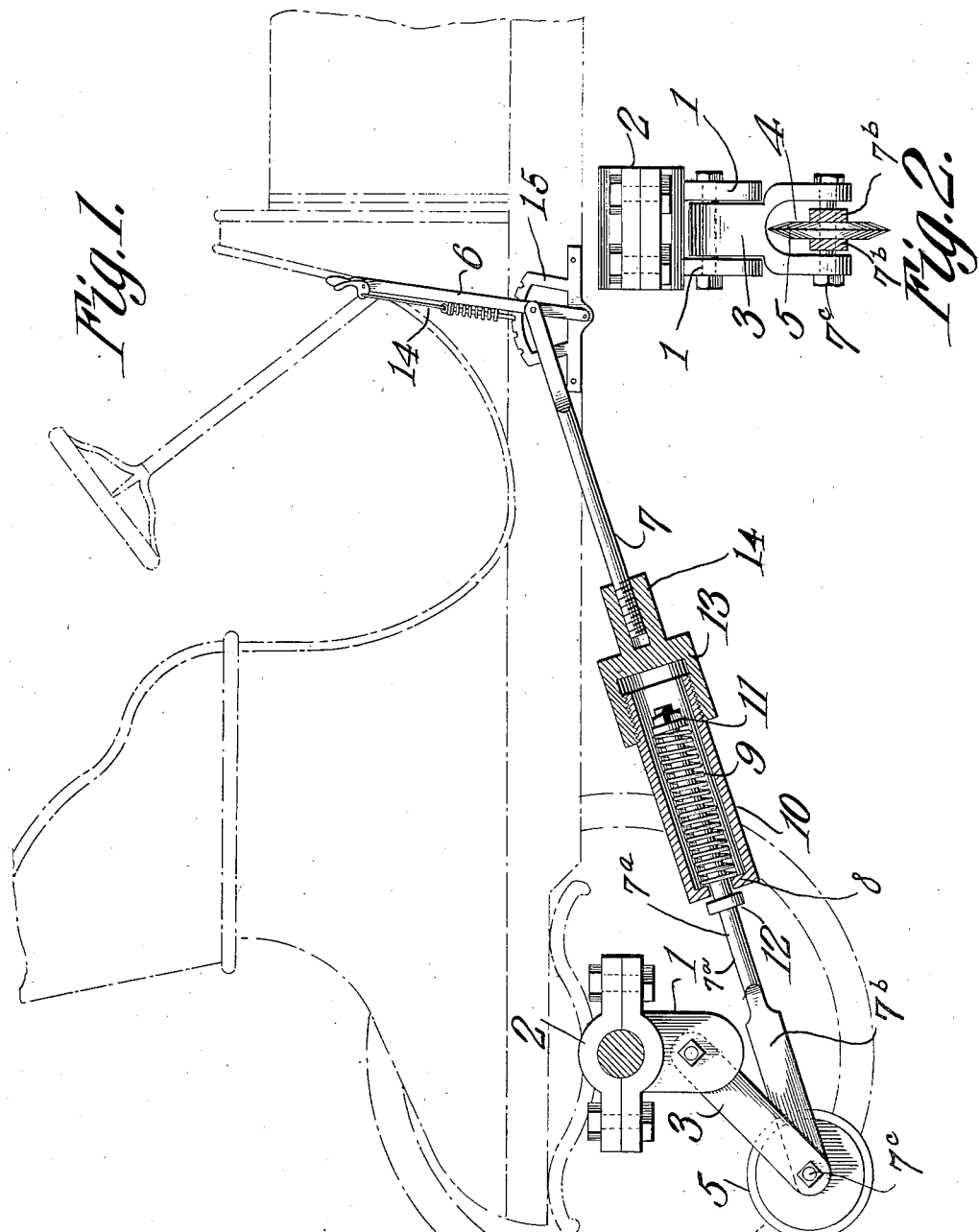

LOUIS JOSEPH CLERGY AND HENRY MORROW, OF BELT, MONTANA.

ANTISKIDDING DEVICE.

No. 923,332.  Specification of Letters Patent.  Patented June 1, 1909.

Application filed January 21, 1908. Serial No. 411,918.

*To all whom it may concern:*

Be it known that we, LOUIS J. CLERGY and HENRY MORROW, citizens of the United States, residing at Belt, in the county of Cascade and State of Montana, have invented a new and useful Antiskidding Device, of which the following is a specification.

This invention has relation to anti-skidding devices adapted to be used upon motor vehicles and the like and it consists in the novel construction and arrangement of its parts as hereinafter shown and described.

The object of the invention is to provide a device of the character indicated which may be applied to a vehicle and which may be operated by means of a lever for the purpose of forcing a supplemental wheel in hard contact with the surface of the road way which additional friction will have a tendency to prevent the vehicle from having lateral skidding movement when making a turn or changing its course of direction.

The device consists primarily of a bracket adapted to be clamped to the hind axle of the vehicle and to which is pivotally attached a fork within which is journaled a friction wheel having a beveled periphery. An operating lever is mounted upon the vehicle and is connected with the fork by means of a member which in turn is provided with a resilient element which enables the friction wheel to pass over obstructions in the road way without jerking the lever from its support.

Figure 1 is a side elevation of the device applied showing parts in section. Fig. 2 is an edge elevation of the bracket, fork and wheel of the device.

The device comprises a bracket embodying a pair of spaced lugs 1, and a clamp 2 by which the bracket is secured to the axle of the vehicle. Pivotally mounted between the lugs is the upper end of the yoke 3, the lower end of which carries a bolt $7^c$ upon which is journaled a wheel 4 having a beveled periphery 5, designed to engage with the surface of the road-way behind the line passing through the point at which the traction wheels of the vehicle engage the road-way. The yoke is actuated by a longitudinally yieldable connecting rod, which comprises two members 7 and $7^a$, the latter of which is provided with a fork, the members $7^b$ of which are disposed between the forks of the yoke 3 and are engaged by the bolt $7^c$, upon which the wheel 4 is journaled. The two members 7 and $7^a$ are connected by a drawhead, which comprises a casing 10 and a cap 13 threaded thereon. The outer wall 8 of the casing is provided with an orifice through which projects the upper end of the member $7^a$, and upon which is arranged a coiled spring 9, one terminal of which bears against the said casing wall. The other terminal of the spring bears against a nut 11 carried by the inner end of the member $7^a$ and is adjustable in order to regulate the tension of the spring. The member $7^a$ is also provided with a rigid stop 12 that serves to limit its inward movement relative to the casing. The cap 13 is provided with a reduced extension 14 that is furnished with a threaded orifice to be engaged by the lower end of the member 7, the upper end of which is connected with the lever 6 pivoted to the base of a locking quadrant 15 secured to the side of the vehicle. This lever is provided with an ordinary spring actuated hand controlled latch 14 arranged to coöperate with the locking quadrant to hold the wheel 4 in or out of engagement with the ground.

From the foregoing description it is obvious that when the lever 6 is forced forwardly the connecting rod is moved longitudinally and the lower end of the fork 3 will describe an arc which forcibly brings the beveled periphery 5 of the wheel 4 in hard contact with the surface of the road way. Should the said wheel 4 engage an obstruction upon the road way the spring 9 will give sufficiently in order to permit the sections of the rod to move longitudinally with relation to each other which will enable the said wheel 4 to ride over such obstruction. When the wheel 4 is in contact with the surface of the road way as above described the beveled periphery thereof will cut into the surface of the road and prevent the vehicle from having any tendency to skid laterally as a result of the change in direction of travel.

Having described our invention, what we claim as new and desire to secure by Letters Patent is:—

The combination with the rear axle of a vehicle, of a clamp rigidly secured thereto and provided with a pair of spaced lugs, a yoke pivoted between the lugs and provided at its lower end with a bolt, a sharpened wheel journaled on the bolt, an operating lever, a locking quadrant with which the lever coöperates, and yieldable means connecting the lever and the bolt comprising a draw-head inclosing a coiled spring, and a pair of rods, one of which has one end rigidly secured to the draw-head and its outer end pivotally connected with the lever, the other rod having one end connected with the said bolt and its other end projected within the draw head and extended through the coiled spring, and provided with a nut by which to regulate the tension of the spring, and a stop carried by the last named rod to limit its inward movement relatively to the draw-head.

In testimony that we claim the foregoing as our own, we have hereto affixed our signatures in the presence of two witnesses.

LOUIS JOSEPH CLERGY.
HENRY MORROW.

Witnesses:
 JNO. S. COOK,
 HENRY L. DES COMBES.